(12) United States Patent
Wang et al.

(10) Patent No.: US 10,659,238 B2
(45) Date of Patent: May 19, 2020

(54) MULTI-PORT PUF CIRCUIT BASED ON MOSFET CURRENT DIVISION DEVIATIONS

(71) Applicant: Ningbo University, Zhejiang (CN)

(72) Inventors: Pengjun Wang, Zhejiang (CN); Gang Li, Zhejiang (CN); Yuejun Zhang, Zhejiang (CN); Huihong Zhang, Zhejiang (CN)

(73) Assignee: Ningbo University, Zhejiang (CN)

( * ) Notice: Subject to any disclaimer, the term of this patent is extended or adjusted under 35 U.S.C. 154(b) by 177 days.

(21) Appl. No.: 16/043,140

(22) Filed: Jul. 23, 2018

(65) Prior Publication Data

US 2019/0058602 A1 Feb. 21, 2019

(30) Foreign Application Priority Data

Aug. 16, 2017 (CN) .......................... 2017 1 0699753

(51) Int. Cl.
*H04L 9/32* (2006.01)
*G06F 21/73* (2013.01)
*G06F 21/72* (2013.01)

(52) U.S. Cl.
CPC ............ *H04L 9/3278* (2013.01); *G06F 21/72* (2013.01); *G06F 21/73* (2013.01)

(58) Field of Classification Search
CPC ....... H04L 9/3278; G06F 21/72; G06F 21/73; G05F 1/561
See application file for complete search history.

(56) References Cited

U.S. PATENT DOCUMENTS

| 2014/0032990 A1* | 1/2014 | Goettfert ............... H03M 13/43 714/760 |
| 2015/0067895 A1* | 3/2015 | Vasyltsov ............... G06F 21/73 726/32 |

(Continued)

OTHER PUBLICATIONS

Yuejun Zhang et al., "Model and physical implementation of multi-port PUF in 65 nm CMOS", International Journal of Electronics, Jul. 25, 2012, pp. 112-125.

(Continued)

*Primary Examiner* — Joseph P Hirl
*Assistant Examiner* — Thomas A Gyorfi
(74) *Attorney, Agent, or Firm* — JCIPRNET (57) ABSTRACT

A multi-port PUF circuit based on MOSFET current division deviations comprises a reference source, a row decoder, a column decoder, a timing controller and 32 PUF arrays. Each PUF array comprises 512 PUF cells arranged in 128 rows and 4 columns, an arbiter, a $1^{st}$ inverter, a $2^{nd}$ inverter, a $3^{rd}$ inverter, a $4^{th}$ inverter and eight transmission gates. The reference source is connected to the PUF arrays. The $m^{th}$ output terminal of the row decoder is connected to the $m^{th}$ row selective signal input terminals of the 32 PUF arrays. The $j^{th}$ output terminal of the column decoder is connected to the $j^{th}$ selective signal input terminals of the 32 PUF arrays. The $1^{st}$ output terminal of the timing controller is connected to the control terminal of the row decoder. The $2^{nd}$ output terminal of the timing controller is connected to the control terminal of the column decoder. The multi-port PUF circuit has the advantages of small circuit area and low power consumption while ensuring circuit performance.

4 Claims, 5 Drawing Sheets

(56) References Cited

U.S. PATENT DOCUMENTS

2015/0178143 A1* 6/2015 Mathew .............. G06F 11/0793
714/5.1
2017/0288885 A1* 10/2017 Khatib Zadeh ....... H04L 9/3278
2018/0191512 A1* 7/2018 Tomishima ............. G06F 21/72

OTHER PUBLICATIONS

Pengjun Wang et al., "Architecture and Physical Implementation of Reconfigurable Multi-Port Physical Unclonable Functions in 65 nm CMOS", IEICE Trans. Fundamentals, May 2013, pp. 963-970.
Chuang Bai et al., "A Novel Thyristor-Based Silicon Physical Unclonable Function", IEEE Transactions on Very Large Scale Integration (VLSI) Systems, Feb. 26, 2015, pp. 290-300.
Yuan Cao et al., "A Low-Power Hybrid RO PUF With Improved Thermal Stability for Lightweight Applications", IEEE Transactions on Computer-Aided Design of Integrated Circuits and Systems, Apr. 21, 2015, pp. 1143-1147.
Dinesh Ganta et al., "A Highly Stable Leakage-Based Silicon Physical Unclonable Functions", 2011 24th Annual Conference on VLSI Design, Jan. 2011, pp. 135-140.
Mukund Kalyanaraman and Michael Orshansky, "Novel Strong PUF based on Nonlinearity of MOSFET Subthreshold Operation", IEEE International Symposium on Hardware-Oriented Security and Trust (HOST), Jun. 2013, pp. 13-18.
Raghavan Kumar and Wayne Burleson, "On Design of a Highly Secure PUF based on Non-Linear Current Mirrors," 2014 IEEE International Symposium on Hardware-Oriented Security and Trust (HOST), May 2014, pp. 38-43.

* cited by examiner

MULTI-PORT PUF CIRCUIT BASED ON MOSFET CURRENT DIVISION DEVIATIONS

CROSS-REFERENCE TO RELATED APPLICATION

This application claims the priority benefit of China application serial no. 201710699753.X, filed on Aug. 16, 2017. The entirety of the above-mentioned patent application is hereby incorporated by reference herein and made a part of this specification.

BACKGROUND OF THE INVENTION

Field of the Invention

The invention relates to a multi-port PUF circuit, in particular to a multi-port PUF circuit based on MOSFET current division deviations.

Description of Related Art

With the rapid development of the information technology, information security has drawn increasing attention. Physical Unclonable Function (PUF) circuits provide an approach for improving the information security on the aspect of hardware texture characteristic. This technique is the DNA characteristic recognition technique in the integrated circuit field. By capturing minor manufacturing process variations (such as electrical properties including voltage, current and delay difference) through corresponding comparing-mechanism, PUF can produce a large number of identifications (IDs), which have the characteristics of randomness, uniqueness and unclonability. The randomness refers to that the output probability of the logic value 0 and the output probability of the logical value 1 of the PUF circuits are basically identical, and that the logic value 0 and the logical value 1 are random distributed. The uniqueness refers to that a specific PUF circuit has unique function performance, namely the specific PUF circuit can generate corresponding unique Challenge Response Pairs (CRPs). The physical unclonablility refers to that it is extremely difficult to clone a circuit with the same CRPs. With the three main characteristics, the PUF circuits have broad application prospects in the information security fields such as equipment identification, key generation, IP protection and attack prevention of security chips.

The integrated circuit technique following the Moore's law has already stepped into the nanoscale; however, the challenge of power consumption is becoming increasingly prominent and has already become the bottleneck restraining the development of integrated circuits, and excessive power consumption also limits the application of the PUF circuits. At present, certain low-power consumption PUF circuits have already been mentioned in certain references, but almost all these PUF circuits are single-port PUF circuits. Although a multi-port PUF circuit can be formed by simply combining multiple single-port PUF circuits, both the chip-area and power consumption will be compromised. Bibliography Zhang Y, Wang P, Li Y, et al. *Model and physical implementation of multi port PUF in 65 nm CMOS[J]. International Journal of Electronics*, 2013, 100(1):1-14 put forwards a model and physical implementation method of a multi-port PUF circuit for the first time, and the multi-port PUF circuit is realized based on process variations of storage cells of a register file. Afterwards, Bibliography Wang P, Zhang Y, Han J, et al. *Architecture and Physical Implementation of Reconfigurable Multi-Port Physical Unclonable Functions in 65 nm CMOS[J]. IEICE Transactions on Fundamentals of Electronics Communications & Computer Sciences*, 2013, E96.A (5):963-970 puts forwards a reconfigurable multi-port physical unclonable function circuit based on an asynchronous clock. The two types of multi-port PUF circuits make a great contribution to reducing the circuit area, but still have the defect of high power consumption.

SUMMARY OF THE INVENTION

The technical issue to be settled by the invention is to provide a multi-port PUF circuit based on MOSFET current division deviations, which is small in circuit area and low in power consumption while ensuring circuit performance.

Technical solutions used by the invention to settle aforesaid technical issue are stated as follows: A multi-port PUF circuit based on MOSFET current division deviations comprises a reference source, a row decoder, a column decoder, a timing controller and 32 PUF arrays. The reference source is provided with a $1^{st}$ voltage output terminal, a $2^{nd}$ voltage output terminal, a $3^{rd}$ voltage output terminal and a current output terminal. The timing controller is provided with a $1^{st}$ output terminal and a $2^{nd}$ output terminal. The row decoder is provided with a control terminal, 7 input terminals and 128 output terminals. The column decoder is provided with a control terminal, 2 input terminals and 4 output terminals. Each PUF array comprises 512 PUF cells, a arbiter, a $1^{st}$ inverter, a $2^{nd}$ inverter, a $3^{rd}$ inverter, a $4^{th}$ inverter and 8 transmission gates, wherein each transmission gate is provided with a $1^{st}$ control terminal, a $2^{nd}$ control terminal, an input terminal and an output terminal, and the 8 transmission gates are the $1^{st}$ transmission gate, the $2^{nd}$ transmission gate, the $3^{rd}$ transmission gate, the $4^{th}$ transmission gate, the $5^{th}$ transmission gate, the $6^{th}$ transmission gate, the $7^{th}$ transmission gate and the $8^{th}$ transmission gate separately; the arbiter is provided with a $1^{st}$ input terminal, a $2^{nd}$ input terminal, a $1^{st}$ bias terminal, a $2^{nd}$ bias terminal and an output terminal; each PUF cell is provided with a control voltage input terminal, a control current input terminal, a selective signal input terminal, a $1^{st}$ output terminal and a $2^{nd}$ output terminal; the 512 PUF cells are arranged in 128 rows and 4 columns, the control voltage input terminals of the 512 PUF cells are connected, the connecting terminal is the $1^{st}$ control voltage input terminal of the corresponding PUF array, the control current input terminals of the 512 PUF cells are connected, the connecting terminal is the control current input terminal of the corresponding PUF array, the selective signal input terminals of the PUF cells in the $m^{th}$ row are connected, the connecting terminal is the $m^{th}$ row selective signal input terminal of the corresponding PUF array, and m=1, 2, . . . , 128; the $1^{st}$ output terminals of the PUF cells in the $1^{st}$ column are connected to the input terminal of the $1^{st}$ transmission gate, the $2^{nd}$ output terminals of the PUF cells in the $1^{st}$ column are connected to the input terminal of the $2^{nd}$ transmission gate, the $1^{st}$ output terminals of the PUF cells in the $2^{nd}$ column are connected to the input terminal of the $3^{rd}$ transmission gate, the $2^{nd}$ output terminals of the PUF cells in the $2^{nd}$ column are connected to the input terminal of the $4^{th}$ transmission gate, the $1^{st}$ output terminals of the PUF cells in the $3^{rd}$ column are connected to the input terminal of the $5^{th}$ transmission gate, the $2^{nd}$ output terminals of the PUF cells in the $3^{rd}$ column are connected to the input terminal of the $6^{th}$ transmission gate, the $1^{st}$ output terminals of the PUF cells in the $4^{th}$ column are connected to the input terminal of the $7^{th}$ transmission gate, and the $2^{nd}$ output terminals of the PUF cells in the $4^{th}$ column are connected to the input terminal of the $8^{th}$ transmission gate; the $1^{st}$ control terminal of the $1^{st}$ transmission gate and the $1^{st}$ control terminal of the $2^{nd}$ transmission gate are connected to the input terminal of the $1^{st}$ inverter, the connecting terminal is the 1st column selective signal input terminal of the corresponding PUF array, the $2^{nd}$ control terminal of the $1^{st}$ transmission gate and the $2^{nd}$ control terminal of the $2^{nd}$ transmission gate are connected to the output terminal of the $1^{st}$ inverter; the $1^{st}$ control terminal of the $3^{rd}$ transmission gate and the $1^{st}$ control terminal of the $4^{th}$ transmission gate are connected to the input terminal of the $2^{nd}$ inverter, the connecting terminal is the $2^{nd}$ column selective signal input terminal of the corresponding PUF array, and the $2^{nd}$ control terminal of the $3^{rd}$ transmission gate and the $2^{nd}$ control terminal of the $4^{th}$ transmission gate are connected to the output terminal of the $2^{nd}$ inverter; the $1^{st}$ control terminal of the $5^{th}$ transmission gate and the $1^{st}$ control terminal of the $6^{th}$ transmission gate are connected to the input terminal of the $3^{rd}$ inverter, the connecting terminal is the $3^{rd}$ column selective signal input terminal of the corresponding PUF array, and the $2^{nd}$ control terminal of the $5^{th}$ transmission gate and the $2^{nd}$ control terminal of the $6^{th}$ transmission gate are connected to the output terminal of the $3^{rd}$ inverter; the $1^{st}$ control terminal of the $7^{th}$ transmission gate and the $1^{st}$ control terminal of the $8^{th}$ transmission gate are connected to the input terminal of the $4^{th}$ inverter, the connecting terminal is the $4^{th}$ column selective signal input terminal of the corresponding PUF array, and the $2^{nd}$ control terminal of the $7^{th}$ transmission gate and the $2^{nd}$ control terminal of the $8^{th}$ transmission gate are connected to the output terminal of the $4^{th}$ inverter; the output terminal of the $1^{st}$ transmission gate, the output terminal of the $3^{rd}$ transmission gate, the output terminal of the $5^{th}$ transmission gate and the output terminal of the $7^{th}$ transmission gate are connected to the $1^{st}$ input terminal of the arbiter; the output terminal of the $2^{nd}$ transmission gate, the output terminal of the $4^{th}$ transmission gate, the output terminal of the $6^{th}$ transmission gate and the output terminal of the $8^{th}$ transmission gate are connected to the $2^{nd}$ input terminal of the arbiter; and the $1^{st}$ bias terminal of the arbiter is the $2^{nd}$ control voltage input terminal of the corresponding PUF array, and the $2^{nd}$ bias terminal of the arbiter is the $3^{rd}$ control voltage input terminal of the corresponding PUF array. The $1^{st}$ voltage output terminal of the reference source is connected to the $1^{st}$ control voltage input terminals of the 32 PUF arrays, the $2^{nd}$ voltage output terminal of the reference source is connected to the $2^{nd}$ control voltage input terminals of the 32 PUF arrays, the $3^{rd}$ voltage output terminal of the reference source is connected to the $3^{rd}$ control voltage input terminals of the 32 PUF arrays, and the current output terminal of the reference source is connected to the control current input terminals of the 32 PUF arrays. The $m^{th}$ output terminal of the row decoder is connected to the $m^{th}$ row selective signal input terminals of the 32 PUF arrays, the $j^{th}$ output terminal of the column decoder is connected to the $j^{th}$ column selective signal input terminals of the 32 PUF arrays, and j=1, 2, 3, 4. The $1^{st}$ output terminal of the timing controller is connected to the control terminal of the row decoder, and the $2^{nd}$ output terminal of the timing controller is connected to the control terminal of the column decoder.

Each PUF cell comprises a $1^{st}$ NMOS transistor, a $2^{nd}$ NMOS transistor, a $3^{rd}$ NMOS transistor and a $4^{th}$ NMOS transistor, wherein the drain of the $1^{st}$ NMOS transistor is connected to the drain of the $2^{nd}$ NMOS transistor, and the connecting terminal is the control current input terminal of the PUF cell; the gate of the $1^{st}$ NMOS transistor is connected to the gate of the $2^{nd}$ NMOS transistor, and the connecting terminal is the control voltage input terminal of the PUF cell; the source of the $1^{st}$ NMOS transistor is connected to the drain of the $3^{rd}$ NMOS transistor, and the source of the $2^{nd}$ NMOS transistor is connected to the drain of the $4^{th}$ NMOS transistor; the source of the $3^{rd}$ NMOS transistor is the $1^{st}$ output terminal of the PUF cell, and the source of the $4^{th}$ NMOS transistor is the $2^{nd}$ output terminal of the PUF cell; and the gate of the $3^{rd}$ NMOS transistor is connected to the gate of the $4^{th}$ NMOS transistor, and the connecting terminal is the selective signal input terminal of the PUF cell. The PUF cells are simple in structure and can be linearly divided in any region, currents input from the control current input terminals of the PUF cells can be linearly divided into two parts when the PUF cells work in any region (a subthreshold region, a linear region and a saturation region), the magnitude of the divided currents only is only related to the width-to-length ratio of the channels of the $1^{st}$ NMOS transistors and the $2^{nd}$ NMOS transistors, and thus power consumption is low.

Each transmission gate comprises a $5^{th}$ NMOS transistor and a $1^{st}$ PMOS transistor, wherein the gate of the $5^{th}$ NMOS transistor is the $1^{st}$ control terminal of the transmission gate, and the gate of the $1^{st}$ PMOS transistor is the $2^{nd}$ control terminal of the transmission gate; the source of the $5^{th}$ NMOS transistor is connected to the source of the $1^{st}$ PMOS transistor, and the connecting terminal is the input terminal of the transmission gate; and the drain of the $5^{th}$ NMOS transistor is connected to the drain of the $1^{st}$ PMOS transistor, and the connecting terminal is the output terminal of the transmission gate. The transmission gates can be selectively connected or disconnected according to signals of the $1^{st}$ control terminals and the $2^{nd}$ control terminals of the transmission gates, and thus deviation current signals of the $1^{st}$ output terminals and the $2^{nd}$ output terminals of the PUF cells are output in order.

The arbiter comprises a $2^{nd}$ PMOS transistor, a $3^{rd}$ PMOS transistor, a $4^{th}$ PMOS transistor, a $5^{th}$ PMOS transistor, a $6^{th}$ PMOS transistor, a $6^{th}$ NMOS transistor, a $7^{th}$ NMOS transistor, an $8^{th}$ NMOS transistor, a $9^{th}$ NMOS transistor, a $10^{th}$ NMOS transistor, a $1^{st}$ operational amplifier, a $2^{nd}$ operational amplifier, a $5^{th}$ inverter, a $6^{th}$ inverter, a $7^{th}$ inverter, an $8^{th}$ inverter, a $9^{th}$ inverter, a $10^{th}$ inverter, a resistor and a capacitor. The $1^{st}$ operational amplifier and the $2^{nd}$ operational amplifier each comprise a positive input terminal, a negative input terminal and an output terminal. The source of the $2^{nd}$ PMOS transistor, the source of the $3^{rd}$ PMOS transistor and the drain of the $6^{th}$ NMOS transistor are all accessed to a power supply. The drain of the $2^{nd}$ PMOS transistor is connected to the source of the $4^{th}$ PMOS transistor. The drain of the $3^{rd}$ PMOS transistor is connected to the source of the $5^{th}$ PMOS transistor. The gate of the $2^{nd}$ PMOS transistor, the gate of the $3^{rd}$ PMOS transistor and the drain of the $5^{th}$ PMOS transistor are connected to the drain of the $7^{th}$ NMOS transistor. The gate of the $4^{th}$ PMOS transistor, the gate of the $5^{th}$ PMOS transistor and the gate of the $9^{th}$ NMOS transistor are connected to the gate of the $10^{th}$ NMOS transistor, and the connecting terminal is the $2^{nd}$ bias terminal of the arbiter. The drain of the $4^{th}$ PMOS transistor, the drain of the $8^{th}$ NMOS transistor, the source of the $6^{th}$ NMOS transistor and the source of the $6^{th}$ PMOS transistor are connected to the input terminal of the $5^{th}$ inverter. The source of the $7^{th}$ NMOS transistor and the drain of the $9^{th}$ NMOS transistor are connected to the negative input terminal of the $1^{st}$ operational amplifier, and the connecting terminal is the $1^{st}$ input terminal of the arbiter. The positive input terminal of the $1^{st}$ operational amplifier is connected to the positive input terminal of the $2^{nd}$ operational amplifier, and the connecting terminal is the $1^{st}$ bias terminal of the arbiter. The gate of the $7^{th}$ NMOS transistor is connected to the output terminal of the $1^{st}$ operational amplifier. The source of the $8^{th}$ NMOS transistor and the drain of the $10^{th}$ NMOS transistor are connected to the negative input terminal of the $2^{nd}$ operational amplifier, and the connecting terminal is the $2^{nd}$ input terminal of the arbiter. The gate of the $8^{th}$ NMOS transistor is connected to the output terminal of the $2^{nd}$ operational amplifier. The source of the $9^{th}$ NMOS transistor, the source of the $10^{th}$ NMOS transistor and the drain of the $6^{th}$ PMOS transistor are all grounded. The gate of the $6^{th}$ NMOS transistor and the gate of the $6^{th}$ PMOS transistor are connected to the output terminal of the $7^{th}$ inverter. The input terminal of the $7^{th}$ inverter and the output terminal of the $6^{th}$ inverter are connected to one terminal of the resistor, and the other terminal of the resistor is connected to one terminal of the capacitor. The other terminal of the capacitor, the input terminal of the $6^{th}$ inverter and the output terminal of the $5^{th}$ inverter are connected to the input terminal of the $8^{th}$ inverter. The output terminal of the $8^{th}$ inverter is connected to the input terminal of the $9^{th}$ inverter. The output terminal of the $9^{th}$ inverter is connected to the input terminal of the $10^{th}$ inverter. The output terminal of the $10^{th}$ inverter is the output terminal of the arbiter. The arbiter can work out the difference of differential signals (bias currents) of the $1^{st}$ output terminals and the $2^{nd}$ output terminals of the PUF cells controlled by output signals of the row decoder and the column decoder and can convert the difference into a binary number 0 or 1 according to the magnitude of the differential current.

As compared with the prior art, the invention has the following advantages: The multi-port PUF circuit is constructed from the reference source, the row decoder, the column decoder, the timing controller and the 32 PUF arrays; each PUF array comprises the 512 PUF cells, the arbiter, the $1^{st}$ inverter, the $2^{nd}$ inverter, the $3^{rd}$ inverter, the $4^{th}$ inverter and the 8 transmission gates, wherein the 512 PUF cells are arranged in 128 rows and 4 columns, the control voltage input terminals of the 512 PUF cells are connected, the connecting terminal is the $1^{st}$ control voltage input terminal of the corresponding PUF array, the control current input terminals of the 512 PUF cells are connected, the connecting terminal is the control current input terminal of the corresponding PUF array, the selective signal input terminals of the PUF cells in the $m^{th}$ row are connected, the connecting terminal is the $m^{th}$ row selective signal input terminal of the corresponding PUF array, and m=1, 2, . . . , 128; the $1^{st}$ output terminals of the PUF cells in the $1^{st}$ column are connected to the input terminal of the $1^{st}$ transmission gate, the $2^{nd}$ output terminals of the PUF cells in the $1^{st}$ column are connected to the input terminal of the $2^{nd}$ transmission gate, the $1^{st}$ output terminals of the PUF cells in the $2^{nd}$ column are connected to the input terminal of the $3^{rd}$ transmission gate, the $2^{nd}$ output terminals of the PUF cells in the $2^{nd}$ column are connected to the input terminal of the $4^{th}$ transmission gate, the $1^{st}$ output terminals of the PUF cells in the $3^{rd}$ column are connected to the input terminal of the $5^{th}$ transmission gate, the $2^{nd}$ output terminals of the PUF cells in the $3^{rd}$ column are connected to the input terminal of the $6^{th}$ transmission gate, the $1^{st}$ output terminals of the PUF cells in the $4^{th}$ column are connected to the input terminal of the $7^{th}$ transmission gate, and the $2^{nd}$ output terminals of the PUF cells in the $4^{th}$ column are connected to the input terminal of the $8^{th}$ transmission gate; the $1^{st}$ control terminal of the $1^{st}$ transmission gate and the $1^{st}$ control terminal of the $2^{nd}$ transmission gate are connected to the input terminal of the $1^{st}$ inverter, the connecting terminal is the $1^{st}$ column selective signal input terminal of the corresponding PUF array, the $2^{nd}$ control terminal of the $1^{st}$ transmission gate and the $2^{nd}$ control terminal of the $2^{nd}$ transmission gate are connected to the output terminal of the $1^{st}$ inverter; the $1^{st}$ control terminal of the $3^{rd}$ transmission gate and the $1^{st}$ control terminal of the $4^{th}$ transmission gate are connected to the input terminal of the $2^{nd}$ inverter, the connecting terminal is the $2^{nd}$ column selective signal input terminal of the corresponding PUF array, and the $2^{nd}$ control terminal of the $3^{rd}$ transmission gate and the $2^{nd}$ control terminal of the $4^{th}$ transmission gate are connected to the output terminal of the $2^{nd}$ inverter; the $1^{st}$ control terminal of the $5^{th}$ transmission gate and the $1^{st}$ control terminal of the $6^{th}$ transmission gate are connected to the input terminal of the $3^{rd}$ inverter, the connecting terminal is the $3^{rd}$ column selective signal input terminal of the corresponding PUF array, and the $2^{nd}$ control terminal of the $5^{th}$ transmission gate and the $2^{nd}$ control terminal of the $6^{th}$ transmission gate are connected to the output terminal of the $3^{rd}$ inverter; the $1^{st}$ control terminal of the $7^{th}$ transmission gate and the $1^{st}$ control terminal of the $8^{th}$ transmission gate are connected to the input terminal of the $4^{th}$ inverter, the connecting terminal is the $4^{th}$ column selective signal input terminal of the corresponding PUF array, and the $2^{nd}$ control terminal of the $7^{th}$ transmission gate and the $2^{nd}$ control terminal of the $8^{th}$ transmission gate are connected to the output terminal of the $4^{th}$ inverter; the output terminal of the $1^{st}$ transmission gate, the output terminal of the $3^{rd}$ transmission gate, the output terminal of the $5^{th}$ transmission gate and the output terminal of the $7^{th}$ transmission gate are connected to the $1^{st}$ input terminal of the arbiter; the output terminal of the $2^{nd}$ transmission gate, the output terminal of the $4^{th}$ transmission gate, the output terminal of the $6^{th}$ transmission gate and the output terminal of the $8^{th}$ transmission gate are connected to the $2^{nd}$ input terminal of the arbiter; the $1^{st}$ bias terminal of the arbiter is the $2^{nd}$ control voltage input terminal of the corresponding PUF array, and the $2^{nd}$ bias terminal of the arbiter is the $3^{rd}$ control voltage input terminal of the corresponding PUF array; the $1^{st}$ voltage output terminal of the reference source is connected to the $1^{st}$ control voltage input terminals of the 32 PUF arrays, the $2^{nd}$ voltage output terminal of the reference source is connected to the $2^{nd}$ control voltage input terminals of the 32 PUF arrays, the $3^{rd}$ voltage output terminal of the reference source is connected to the $3^{rd}$ control voltage input terminals of the 32 PUF arrays, and the current output terminal of the reference source is connected to the control current input terminals of the 32 PUF arrays; the $m^{th}$ output terminal of the row decoder is connected to the $m^{th}$ row selective signal input terminals of the 32 PUF arrays, the $j^{th}$ output terminal of the column decoder is connected to the $j^{th}$ column selective signal input terminals of the 32 PUF arrays, and j=1, 2, 3, 4; and the $1^{st}$ output terminal of the timing controller is connected to the control terminal of the row decoder, and the $2^{nd}$ output terminal of the timing controller is connected to the control terminal of the column decoder. The multi-port PUF circuit of the invention can output multiple keys in a clock cycle, each key is obtained by comparing the differential current of the $1^{st}$ output terminal and the $2^{nd}$ output terminal of one selected PUF cell, the PUF cells are the main power consumption modules, the PUF arrays work in the subthreshold region, and thus power consumption can be greatly reduced; and a TSMC 65 nm process database is adopted, the layout of the PUF circuit of the invention is designed through a full customization method, the circuit area is 143 μm*246 μm, and the average power consumption is 10.3 µW when the PUF circuit operates at 100 MHz, and tests show that the multi-port PUF circuit of the invention has high reliability, randomness and uniqueness, thereby being small in circuit area and low in power consumption while ensuring circuit performance.

DESCRIPTION OF THE EMBODIMENTS

The invention is further described as follows in combination with drawings and embodiments.

First Embodiment

Figure 1:
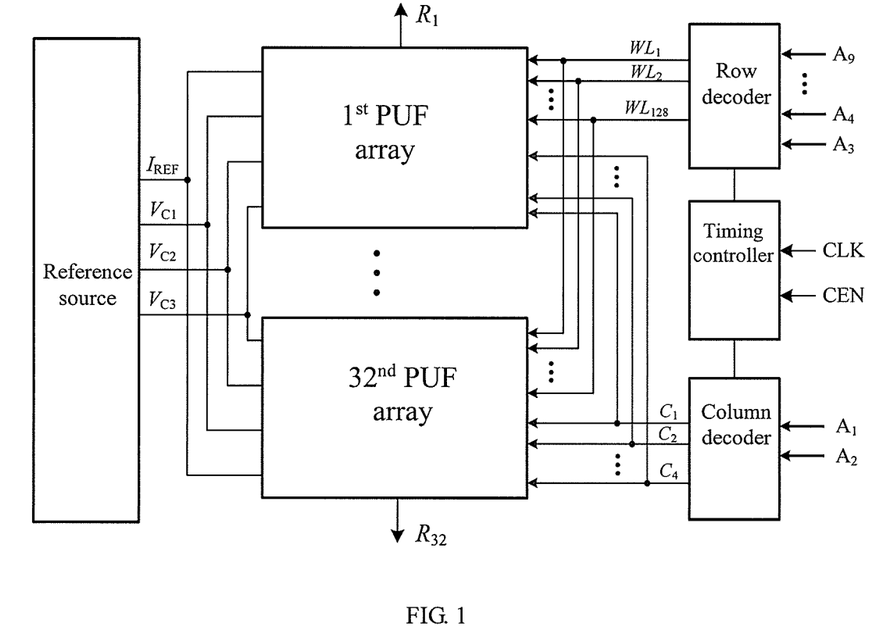
FIG. 1 is a structural block diagram of a multi-port PUF circuit based on MOSFET current division deviations of the invention.
Figure 2:
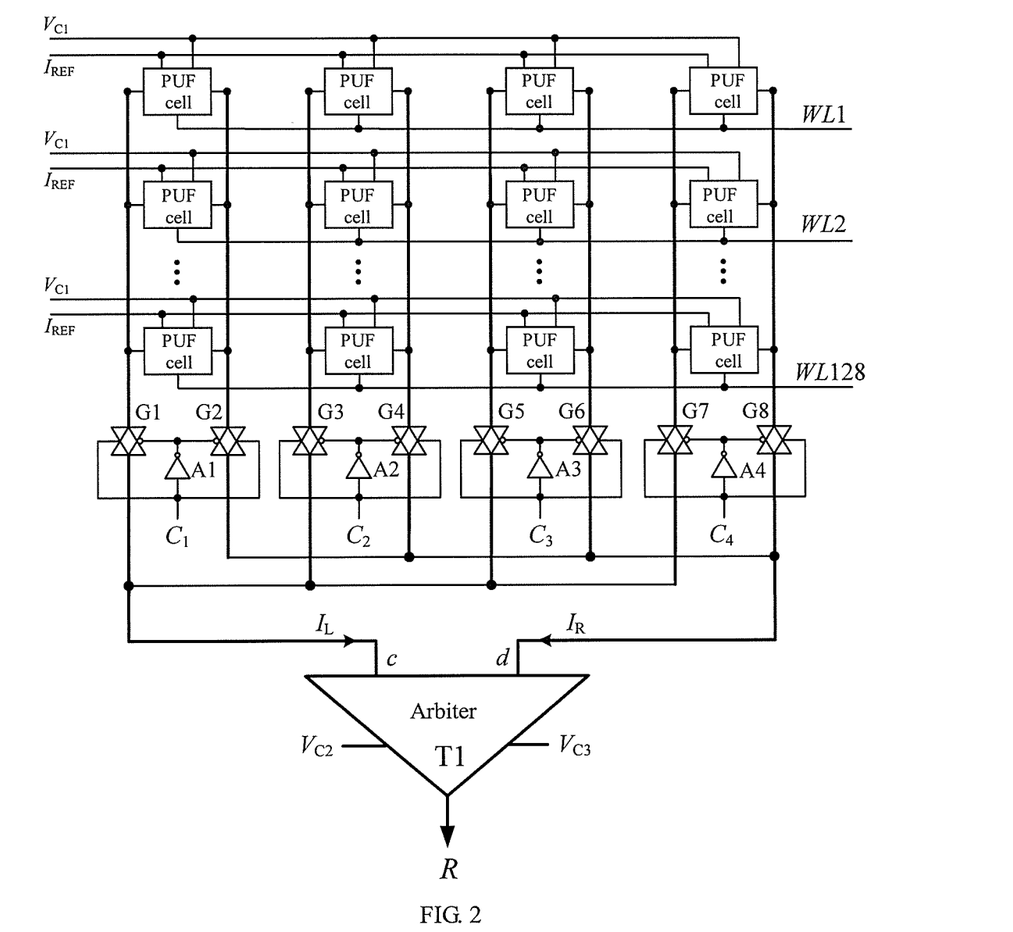
FIG. 2 is a circuit diagram of a PUF array of the multi-port PUF circuit based on MOSFET current division deviations of the invention.

As is shown in FIG. 1 and FIG. 2, a multi-port PUF circuit based on MOSPEF current division deviations comprises a reference source, a row decoder, a column decoder, a timing controller and 32 PUF arrays. The reference source is provided with a $1^{st}$ voltage output terminal, a $2^{nd}$ voltage output terminal, a $3^{rd}$ voltage output terminal and a current output terminal. The timing controller is provided with a $1^{st}$ output terminal and a $2^{nd}$ output terminal. The row decoder is provided with a control terminal, 7 input terminals and 128 output terminals. The column decoder is provided with a control terminal, 2 input terminals and 4 output terminals. Each PUF array comprises 512 PUF cells, an arbiter T1, a $1^{st}$ inverter A1, a $2^{nd}$ inverter A2, a $3^{rd}$ inverter A3, a $4^{th}$ inverter A4 and 8 transmission gates, wherein each transmission gate is provided with a $1^{st}$ control terminal, a $2^{nd}$ control terminal, an input terminal and an output terminal, and the 8 transmission gates are the 1st transmission gate G1, the $2^{nd}$ transmission gate G2, the $3^{rd}$ transmission gate G3, the $4^{th}$ transmission gate G4, the $5^{th}$ transmission gate G5, the $6^{th}$ transmission gate G6, the $7^{th}$ transmission gate G7 and the $8^{th}$ transmission gate G8 separately; the arbiter T1 is provided with a $1^{st}$ input terminal, a $2^{nd}$ input terminal, a $1^{st}$ bias terminal, a $2^{nd}$ bias terminal and an output terminal; each PUF cell is provided with a control voltage input terminal, a control current input terminal, a selective signal input terminal, a $1^{st}$ output terminal and a $2^{nd}$ output terminal; the 512 PUF cells are arranged in 128 rows and 4 columns, the control voltage input terminals of the 512 PUF cells are connected, the connecting terminal is the $1^{st}$ control voltage input terminal of the corresponding PUF array, the control current input terminals of the 512 PUF cells are connected, the connecting terminal is the control current input terminal of the corresponding PUF array, the selective signal input terminals of the PUF cells in the $m^{th}$ row are connected, the connecting terminal is the $m^{th}$ row selective signal input terminal of the corresponding PUF array, and m=1, 2, . . . , 128; the $1^{st}$ output terminals of the PUF cells in the 1st column are connected to the input terminal of the $1^{st}$ transmission gate G1, the $2^{nd}$ output terminals of the PUF cells in the $1^{st}$ column are connected to the input terminal of the $2^{nd}$ transmission gate G2, the $1^{st}$ output terminals of the PUF cells in the $2^{nd}$ column are connected to the input terminal of the $3^{rd}$ transmission gate G3, the $2^{nd}$ output terminals of the PUF cells in the $2^{nd}$ column are connected to the input terminal of the $4^{th}$ transmission gate G4, the $1^{st}$ output terminals of the PUF cells in the $3^{rd}$ column are connected to the input terminal of the $5^{th}$ transmission gate G5, the $2^{nd}$ output terminals of the PUF cells in the $3^{rd}$ column are connected to the input terminal of the $6^{th}$ transmission gate G6, the $1^{st}$ output terminals of the PUF cells in the $4^{th}$ column are connected to the input terminal of the $7^{th}$ transmission gate G7, and the $2^{nd}$ output terminals of the PUF cells in the $4^{th}$ column are connected to the input terminal of the $8^{th}$ transmission gate G8; the $1^{st}$ control terminal of the $1^{st}$ transmission gate G1 and the $1^{st}$ control terminal of the $2^{nd}$ transmission gate G2 are connected to the input terminal of the $1^{st}$ inverter A1, the connecting terminal is the $1^{st}$ column selective signal input terminal of the corresponding PUF array, the $2^{nd}$ control terminal of the $1^{st}$ transmission gate G1 and the $2^{nd}$ control terminal of the $2^{nd}$ transmission gate G2 are connected to the output terminal of the $1^{st}$ inverter A1; the $1^{st}$ control terminal of the $3^{rd}$ transmission gate G3 and the $1^{st}$ control terminal of the $4^{th}$ transmission gate G4 are connected to the input terminal of the $2^{nd}$ inverter A2, the connecting terminal is the $2^{nd}$ column selective signal input terminal of the corresponding PUF array, and the $2^{nd}$ control ten final of the $3^{rd}$ transmission gate G3 and the $2^{nd}$ control terminal of the $4^{th}$ transmission gate G4 are connected to the output terminal of the $2^{nd}$ inverter A2; the $1^{st}$ control terminal of the $5^{th}$ transmission gate G5 and the $1^{st}$ control terminal of the $6^{th}$ transmission gate G6 are connected to the input terminal of the $3^{rd}$ inverter A3, the connecting terminal is the $3^{rd}$ column selective signal input terminal of the corresponding PUF array, and the $2^{nd}$ control terminal of the $5^{th}$ transmission gate G5 and the $2^{nd}$ control terminal of the $6^{th}$ transmission gate G6 are connected to the output terminal of the $3^{rd}$ inverter A3; the $1^{st}$ control terminal of the $7^{th}$ transmission gate G7 and the $1^{st}$ control terminal of the $8^{th}$ transmission gate G8 are connected to the input terminal of the $4^{th}$ inverter A4, the connecting terminal is the $4^{th}$ column selective signal input terminal of the corresponding PUF array, and the $2^{nd}$ control terminal of the $7^{th}$ transmission gate G7 and the $2^{nd}$ control terminal of the $8^{th}$ transmission gate G8 are connected to the output terminal of the $4^{th}$ inverter A4; the output terminal of the 1st transmission gate G1, the output terminal of the $3^{rd}$ transmission gate G3, the output terminal of the $5^{th}$ transmission gate G5 and the output terminal of the $7^{th}$ transmission gate G7 are connected to the $1^{st}$ input terminal of the arbiter T1; the output terminal of the $2^{nd}$ transmission gate G2, the output terminal of the $4^{th}$ transmission gate G4, the output terminal of the $6^{th}$ transmission gate G6 and the output terminal of the $8^{th}$ transmission gate G8 are connected to the $2^{nd}$ input terminal of the arbiter T1; and the 1st bias terminal of the arbiter T1 is the $2^{nd}$ control voltage input terminal of the corresponding PUF array, and the $2^{nd}$ bias terminal of the arbiter T1 is the $3^{rd}$ control voltage input terminal of the corresponding PUF array. The $1^{st}$ voltage output terminal of the reference source is connected to the $1^{st}$ control voltage input terminals of the 32 PUF arrays, the $2^{nd}$ voltage output terminal of the reference source is connected to the $2^{nd}$ control voltage input terminals of the 32 PUF arrays, the $3^{rd}$ voltage output terminal of the reference source is connected to the $3^{rd}$ control voltage input terminals of the 32 PUF arrays, and the current output terminal of the reference source is connected to the control current input terminals of the 32 PUF arrays. The $m^{th}$ output terminal of the row decoder is connected to the $m^{th}$ row selective signal input terminals of the 32 PUF arrays, the $j^{th}$ output terminal of the column decoder is connected to the $j^{th}$ column selective signal input terminals of the 32 PUF arrays, and j=1, 2, 3, 4. The $1^{st}$ output terminal of the timing controller is connected to the control terminal of the row decoder, and the $2^{nd}$ output terminal of the timing controller is connected to the control terminal of the column decoder.

Second Embodiment

As is shown in FIG. 1 and FIG. 2, a multi-port PUF circuit based on MOSPEF current division deviations comprises a reference source, a row decoder, a column decoder, a timing controller and 32 PUF arrays. The reference source is provided with a $1^{st}$ voltage output terminal, a $2^{nd}$ voltage output terminal, a $3^{rd}$ voltage output terminal and a current output terminal. The timing controller is provided with a $1^{st}$ output terminal and a $2^{nd}$ output terminal. The row decoder is provided with a control terminal, 7 input terminals and 128 output terminals. The column decoder is provided with a control terminal, 2 input terminals and 4 output terminals. Each PUF array comprises 512 PUF cells, an arbiter T1, a $1^{st}$ inverter A1, a $2^{nd}$ inverter A2, a $3^{rd}$ inverter A3, a $4^{th}$ inverter A4 and 8 transmission gates, wherein each transmission gate is provided with a $1^{st}$ control terminal, a $2^{nd}$ control terminal, an input terminal and an output terminal, and the 8 transmission gates are the $1^{st}$ transmission gate G1, a $2^{nd}$ transmission gate G2, a $3^{rd}$ transmission gate G3, the $4^{th}$ transmission gate G4, the $5^{th}$ transmission gate G5, the $6^{th}$ transmission gate G6, the $7^{th}$ transmission gate G7 and the $8^{th}$ transmission gate G8 separately; the arbiter T1 is provided with a $1^{st}$ input terminal, a $2^{nd}$ input terminal, a $1^{st}$ bias terminal, a $2^{nd}$ bias terminal and an output terminal; each PUF cell is provided with a control voltage input terminal, a control current input terminal, a selective signal input terminal, a $1^{st}$ output terminal and a $2^{nd}$ output terminal, the 512 PUF cells are arranged in 128 rows and 4 columns, the control voltage input terminals of the 512 PUF cells are connected, the connecting terminal is the $1^{st}$ control voltage input terminal of the corresponding PUF array, the control current input terminals of the 512 PUF cells are connected, the connecting terminal is the control current input terminal of the corresponding PUF array, the selective signal input terminals of the PUF cells in the $m^{th}$ row are connected, the connecting terminal is the $m^{th}$ row selective signal input terminal of the corresponding PUF array, and m=1, 2, . . . , 128; the $1^{st}$ output terminals of the PUF cells in the $1^{st}$ column are connected to the input terminal of the $1^{st}$ transmission gate G1, the $2^{nd}$ output terminals of the PUF cells in the $1^{st}$ column are connected to the input terminal of the $2^{nd}$ transmission gate G2, the $1^{st}$ output terminals of the PUF cells in the $2^{nd}$ column are connected to the input terminal of the $3^{rd}$ transmission gate G3, the $2^{nd}$ output terminals of the PUF cells in the $2^{nd}$ column are connected to the input terminal of the $4^{th}$ transmission gate G4, the $1^{st}$ output terminals of the PUF cells in the $3^{rd}$ column are connected to the input terminal of the $5^{th}$ transmission gate G5, the $2^{nd}$ output terminals of the PUF cells in the $3^{rd}$ column are connected to the input terminal of the $6^{th}$ transmission gate G6, the $1^{st}$ output terminals of the PUF cells in the $4^{th}$ column are connected to the input terminal of the $7^{th}$ transmission gate G7, and the $2^{nd}$ output terminals of the PUF cells in the $4^{th}$ column are connected to the input terminal of the $8^{th}$ transmission gate G8; the $1^{st}$ control terminal of the $1^{st}$ transmission gate G1 and the $1^{st}$ control terminal of the $2^{nd}$ transmission gate G2 are connected to the input terminal of the $1^{st}$ inverter A1, the connecting terminal is the $1^{st}$ column selective signal input terminal of the corresponding PUF array, the $2^{nd}$ control terminal of the $1^{st}$ transmission gate G1 and the $2^{nd}$ control terminal of the $2^{nd}$ transmission gate G2 are connected to the output terminal of the $1^{st}$ inverter A1; the $1^{st}$ control terminal of the $3^{rd}$ transmission gate G3 and the $1^{st}$ control terminal of the $4^{th}$ transmission gate G4 are connected to the input terminal of the $2^{nd}$ inverter A2, the connecting terminal is the $2^{nd}$ column selective signal input terminal of the corresponding PUF array, and the $2^{nd}$ control terminal of the $3^{rd}$ transmission gate G3 and the $2^{nd}$ control terminal of the $4^{th}$ transmission gate G4 are connected to the output terminal of the $2^{nd}$ inverter A2; the $1^{st}$ control terminal of the $5^{th}$ transmission gate G5 and the $1^{st}$ control terminal of the $6^{th}$ transmission gate G6 are connected to the input terminal of the $3^{rd}$ inverter A3, the connecting terminal is the $3^{rd}$ column selective signal input terminal of the corresponding PUF array, and the $2^{nd}$ control terminal of the $5^{th}$ transmission gate G5 and the $2^{nd}$ control terminal of the $6^{th}$ transmission gate G6 are connected to the output terminal of the $3^{rd}$ inverter A3; the $1^{st}$ control terminal of the $7^{th}$ transmission gate G7 and the $1^{st}$ control terminal of the $8^{th}$ transmission gate G8 are connected to the input terminal of the $4^{th}$ inverter A4, the connecting terminal is the $4^{th}$ column selective signal input terminal of the corresponding PUF array, and the $2^{nd}$ control terminal of the 7th transmission gate G7 and the $2^{nd}$ control terminal of the $8^{th}$ transmission gate G8 are connected to the output terminal of the $4^{th}$ inverter A4; the output terminal of the $1^{st}$ transmission gate G1, the output terminal of the $3^{rd}$ transmission gate G3, the output terminal of the $5^{th}$ transmission gate G5 and the output terminal of the $7^{th}$ transmission gate G7 are connected to the $1^{st}$ input terminal of the arbiter T1; the output terminal of the $2^{nd}$ transmission gate G2, the output terminal of the $4^{th}$ transmission gate G4, the output terminal of the $6^{th}$ transmission gate G6 and the output terminal of the $8^{th}$ transmission gate G8 are connected to the $2^{nd}$ input ten Anal of the arbiter T1; and the $1^{st}$ bias terminal of the arbiter T1 is the $2^{nd}$ control voltage input terminal of the corresponding PUF array, and the $2^{nd}$ bias terminal of the arbiter T1 is the $3^{rd}$ control voltage input terminal of the corresponding PUF array. The $1^{st}$ voltage output terminal of the reference source is connected to the $1^{st}$ control voltage input terminals of the 32 PUF arrays, the $2^{nd}$ voltage output terminal of the reference source is connected to the $2^{nd}$ control voltage input terminals of the 32 PUF arrays, the $3^{rd}$ voltage output terminal of the reference source is connected to the $3^{rd}$ control voltage input terminals of the 32 PUF arrays, and the current output terminal of the reference source is connected to the control current input terminals of the 32 PUF arrays. The $m^{th}$ output terminal of the row decoder is connected to the $m^{th}$ row selective signal input terminals of the 32 PUF arrays, the $j^{th}$ output terminal of the column decoder is connected to the $j^{th}$ column selective signal input terminals of the 32 PUF arrays, and j=1, 2, 3, 4. The $1^{st}$ output terminal of the timing controller is connected to the control terminal of the row decoder, and the $2^{nd}$ output terminal of the timing controller is connected to the control terminal of the column decoder.

Figure 3:
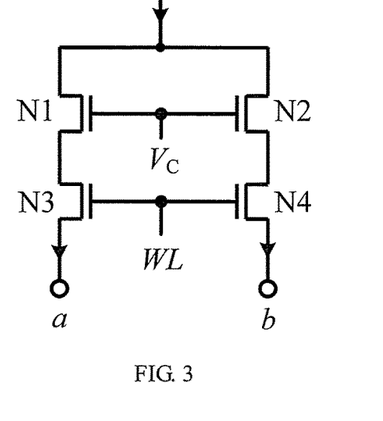
FIG. 3 is a circuit diagram of a PUF cell of the multi-port PUF circuit based on MOSFET current division deviations of the invention.

As is shown in FIG. 3, in this embodiment, each PUF cell comprises a $1^{st}$ NMOS transistor N1, a $2^{nd}$ NMOS transistor N2, a $3^{rd}$ NMOS transistor N3 and a $4^{th}$ NMOS transistor N4, wherein the drain of the $1^{st}$ NMOS transistor N1 is connected to the drain of the $2^{nd}$ NMOS transistor N2, and the connecting terminal is the control current input terminal of the PUF cell; the gate of the $1^{st}$ NMOS transistor N1 is connected to the gate of the $2^{nd}$ NMOS transistor N2, and the connecting terminal is the control voltage input terminal of the PUF cell; the source of the $1^{st}$ NMOS transistor N1 is connected to the drain of the $3^{rd}$ NMOS transistor N3, and the source of the $2^{nd}$ NMOS transistor N2 is connected to the drain of the $4^{th}$ NMOS transistor N4; the source of the $3^{rd}$ NMOS transistor N3 is the $1^{st}$ input terminal of the PUF cell, and the source of the $4^{th}$ NMOS transistor N4 is the $2^{nd}$ output terminal of the PUF cell; and the gate of the $3^{rd}$ NMOS transistor N3 is connected to the gate of the $4^{th}$ NMOS transistor N4, and the connecting terminal is the selective signal input terminal of the PUF cell.

Figure 4:
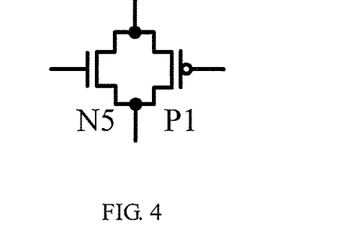
FIG. 4 is a circuit diagram of a transmission gate of the multi-port PUF circuit based on MOSFET current division deviation of the invention.

As is shown in FIG. 4, in this embodiment, each transmission gate comprises a $5^{th}$ NMOS transistor N5 and a $1^{st}$ PMOS transistor P1, wherein the gate of the $5^{th}$ NMOS transistor N5 is the $1^{st}$ control terminal of the transmission gate, and the gate of the $1^{st}$ PMOS transistor P1 is the $2^{nd}$ control terminal of the transmission gate; the source of the $5^{th}$ NMOS transistor N5 is connected to the source of the $1^{st}$ PMOS transistor P1, and the connecting terminal is the input terminal of the transmission gate; and the drain of the $5^{th}$ NMOS transistor N5 is connected to the drain of the $1^{st}$ PMOS transistor P1, and the connecting terminal is the output terminal of the transmission gate.

Figure 5:
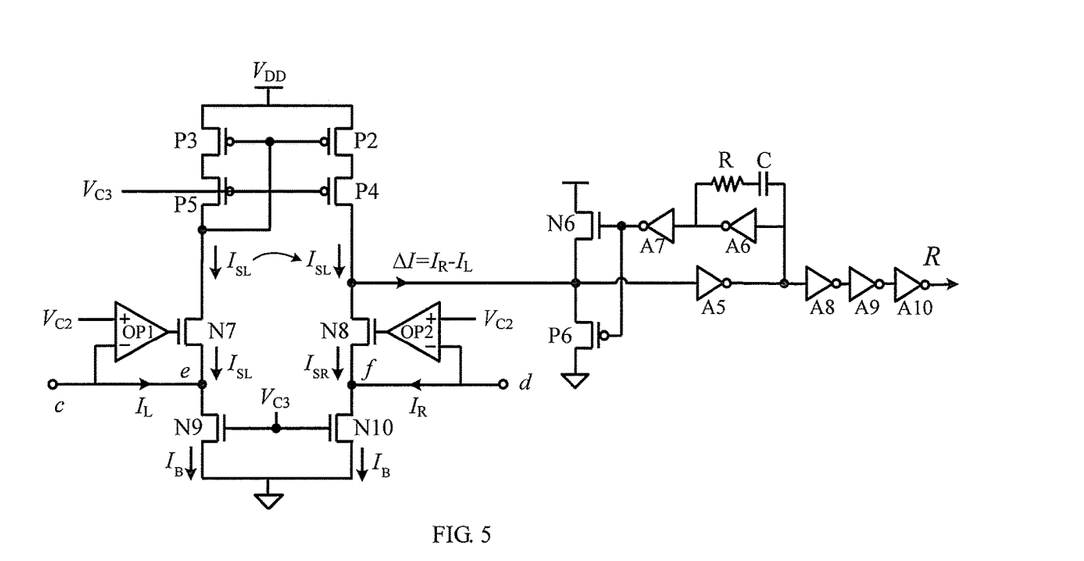
FIG. 5 is a circuit diagram of an arbiter of the multi-port PUF circuit based on MOSFET current division deviations of the invention.

As is shown in FIG. 5, in this embodiment, the arbiter T1 comprises a $2^{nd}$ PMOS transistor P2, a $3^{rd}$ PMOS transistor P3, a $4^{th}$ PMOS transistor P4, a $5^{th}$ PMOS transistor P5, a $6^{th}$ PMOS transistor P6, a $6^{th}$ NMOS transistor N6, a $7^{th}$ NMOS transistor N7, an $8^{th}$ NMOS transistor N8, a $9^{th}$ NMOS transistor N9, a $10^{th}$ NMOS transistor N10, a $1^{st}$ operational amplifier OP1, a $2^{nd}$ operational amplifier OP2, a $5^{th}$ inverter A1, a $6^{th}$ inverter A6, a $7^{th}$ inverter A7, an $8^{th}$ inverter A8, a $9^{th}$ inverter A9, a $10^{th}$ inverter A10, a resistor and a capacitor. The $1^{st}$ operational amplifier OP1 and the $2^{nd}$ operational amplifier OP2 each comprise a positive input terminal, a negative input terminal and an output terminal. The source of the $2^{nd}$ PMOS transistor P2, the source of the $3^{rd}$ PMOS transistor P3 and the drain of the $6^{th}$ NMOS transistor N6 are all connected to a power supply VDD. The drain of the $2^{nd}$ PMOS transistor P2 is connected to the source of the $4^{th}$ PMOS transistor P4. The drain of the 3th PMOS transistor P3 is connected to the source of the $5^{th}$ PMOS transistor P5. The gate of the $2^{nd}$ PMOS transistor P2, the gate of the $3^{rd}$ PMOS transistor P3 and the drain of the $5^{th}$ PMOS transistor P5 are connected to the drain of the $7^{th}$ NMOS transistor N7. The gate of the $4^{th}$ PMOS transistor P4, the gate of the $5^{th}$ PMOS transistor P5 and the gate of the $9^{th}$ NMOS transistor N9 are connected to the gate of the $10^{th}$ NMOS transistor N10, and the connecting terminal is the $2^{nd}$ bias terminal of the arbiter T1. The drain of the 4th PMOS transistor P4, the drain of the $8^{th}$ NMOS transistor N8, the source of the 6th NMOS transistor N6 and the source of the $6^{th}$ PMOS transistor P6 are connected to the input terminal of the $5^{th}$ inverter A5. The source of the $7^{th}$ NMOS transistor N7 and the drain of the $9^{th}$ NMOS transistor N9 are connected to the negative input terminal of the $1^{st}$ operational amplifier OP1, and the connecting terminal is the $1^{st}$ input terminal of the arbiter T1. The positive input terminal of the $1^{st}$ operational amplifier OP1 is connected to the positive input terminal of the $2^{nd}$ operational amplifier OP2, and the connecting terminal is the $1^{st}$ bias terminal of the arbiter T1. The gate of the $7^{th}$ NMOS transistor N7 is connected to the output terminal of the $1^{st}$ operational amplifier OP1. The source of the $8^{th}$ NMOS transistor N8 and the drain of the $10^{th}$ NMOS transistor N10 are connected to the negative input terminal of the $2^{nd}$ operational amplifier OP2, and the connecting terminal is the $2^{nd}$ input terminal of the arbiter T1. The gate of the $8^{th}$ NMOS transistor N8 is connected to the output terminal of the $2^{nd}$ operational amplifier OP2. The source of the $9^{th}$ NMOS transistor N9, the source of the $10^{th}$ NMOS transistor N10 and the drain of the $6^{th}$ PMOS transistor P6 are all grounded. The gate of the $6^{th}$ NMOS transistor N6 and the gate of the $6^{th}$ PMOS transistor P6 are connected to the output terminal of the $7^{th}$ inverter A7. The input terminal of the $7^{th}$ inverter A7 and the output terminal of the $6^{th}$ inverter A6 are connected to one terminal of the resistor, and the other terminal of the resistor is connected to one terminal of the capacitor. The other terminal of the capacitor, the input terminal of the $6^{th}$ inverter A6 and the output terminal of the $5^{th}$ inverter A5 are connected to the input terminal of the $8^{th}$ inverter A8. The output terminal of the 8th inverter A8 is connected to the input terminal of the $9^{th}$ inverter A9. The output terminal of the $9^{th}$ inverter A9 is connected to the input terminal of the $10^{th}$ inverter A10. The output terminal of the $10^{th}$ inverter A10 is the output terminal of the arbiter T1.

In this embodiment, mature products in corresponding technical fields are adopted to serve as the reference source, the row decoder, the column decoder and the timing controller, and the timing controller ensures that the whole multi-port PU circuit is operated in order. The $1^{st}$ voltage output terminal of the reference source outputs a $1^{st}$ voltage $V_{C1}$, the $2^{nd}$ voltage output terminal of the reference source outputs a $2^{nd}$ voltage $V_{C2}$, the $3^{rd}$ voltage output terminal of the reference source outputs a $3^{rd}$ voltage $V_{C3}$, and the current output terminal of the reference source outputs a current $I_{REF}$. Wherein, the voltage of the power supply VDD is 1.2V, the $1^{st}$ voltage $V_{C1}$ is 0.67V, the $2^{nd}$ voltage $V_{C2}$ is 0.3V, the $3^{rd}$ voltage $V_{C3}$ is 0.5V, and the output current $I_{REF}$ is 4 µA.

Figure 6:
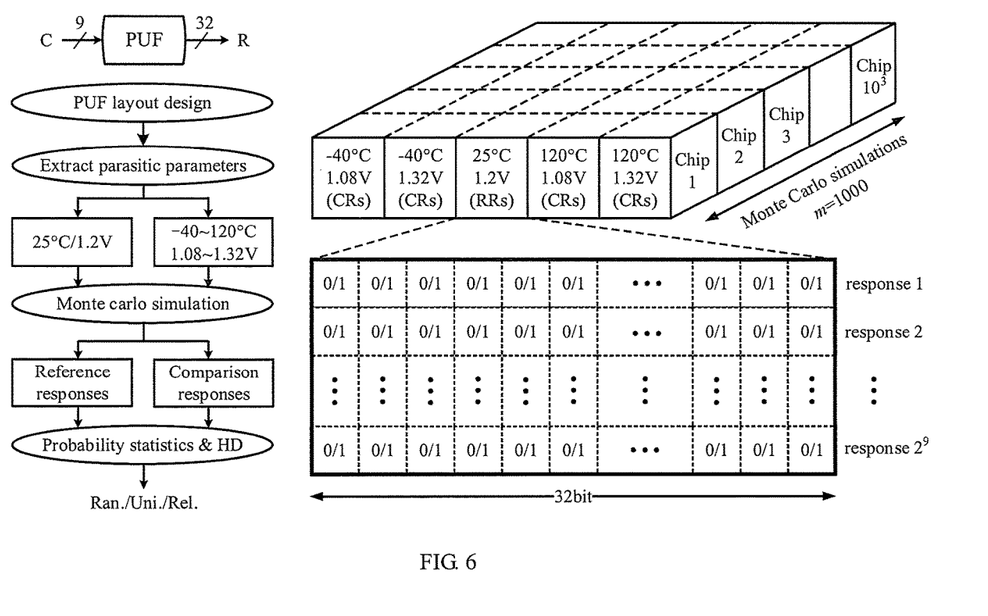
FIG. 6 is a simulation analysis flow diagram of the multi-port PUF circuit based on MOSFET current division deviations of the invention.

A TSMC 65 nm process database is adopted, the layout of the PUF circuit of the invention is designed through a full customization method, the circuit area is 143 µm×246 µm, and the average power consumption is 10.3 µW when the circuit operates at 100 MHz. The layout parasitic parameters of the circuit are extracted, all the performance of the circuit is simulated by means of Cadence/Spectre, and the randomness, uniqueness and reliability of the output response of the circuit are tested separately. FIG. 6 shows the simulation analysis process.

Entropy is used for quantitatively analyzing the randomness (disorderliness) degree of an information source so as to evaluate the safety of the PUF circuit. As output data of the PUF circuit can be in two states only, namely the logic level 0 and the logic level 1, the Entropy can be represented as:

$$\text{Entropy} = -\sum_{r=0}^{1} p(r)\log_2 p(r).$$

Figure 7:
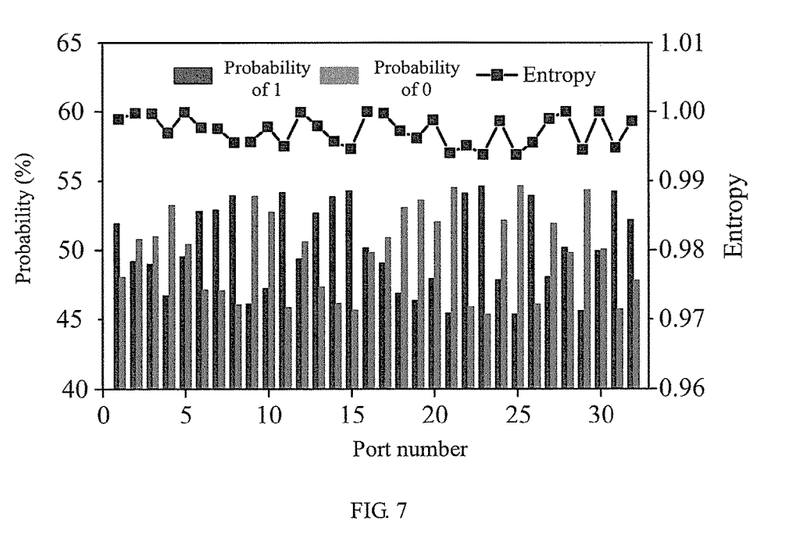
FIG. 7 shows the random distribution condition of the multi-port PUF circuit based on MOSFET current division deviations of the invention.

Wherein, p(r=0) and p(r=1) separately represent the probabilities of the logic level 1 and the logic level 0 of output responses of all ports of the PUF circuit, and when and only when p(r=0)=p(r=1)=0.5, Entropy=1. FIG. 7 shows the randomness distribution condition of the PUF circuit of the invention. As is shown in FIG. 7, the entropy of the output responses of all the ports of the PUF circuit is greater than 0.99, and thus the circuit has extremely high randomness.

Uniqueness represents the discrimination of any individual of the PUF circuit from other individuals. Generally, the uniqueness is evaluated by recoding the Hamming Distance (HD) between the output responses of different individuals of a certain number of PUF circuits under the same condition, the Hamming Distance is 50% under the ideal condition, and the inter-chip Hamming Distance $HD_{inter}$ of between m PUF circuits with n ports can be represented as:

$$HD_{inter} = \frac{2}{m(m-1)}\sum_{i=1}^{m-1}\sum_{j=i+1}^{m}\frac{HD(r_i, r_j)}{n} \times 100\%$$

Wherein, $r_i$ and $r_j$ separately represent n-bit output responses generated by the $i^{th}$ PUF circuit and the $j^{th}$ PUF circuit under the same excitation. Thus, the average inter-chip Hamming Distance $E(HD_{inter})$ of the m n-port PUF circuits under w different excitations can be represented as:

$$E(HD_{inter}) = \frac{1}{w}\sum_{l=1}^{w} HD_{inter\_l} \times 100\%$$

Figure 8:
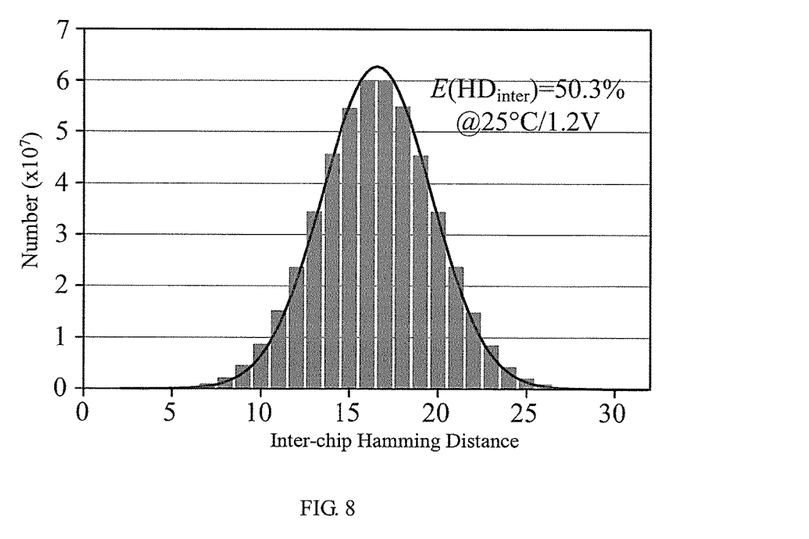
FIG. 8 is an inter-chip Hamming Distance statistical graph of the multi-port PUF circuit based on MOSFET current division deviations of the invention.

FIG. 8 shows the inter-chip Hamming distance statistical graph of the PUF circuit of the invention. As can be seen from FIG. 8, the Hamming Distance between different responses under the same excitation is in normal distribution with respect to 16(32/2), and under a standard operating condition (25° C./1.2V), $E(HD_{inter})$ is 50.3% and is extremely close to the ideal value.

Reliability is an important performance index of the PUF circuit and is used for indicating the credibility of the PUF circuit in different operating environments. The reliability (Rel) of the n-port PUF circuits under w different excitations can be measured according to the follow formula:

$$Rel = 1 - E(HD_{intra}) = \left(1 - \frac{1}{w}\sum_{l=1}^{w}\frac{HD(r_0, r_l)}{n}\right) \times 100\%$$

Figure 9:
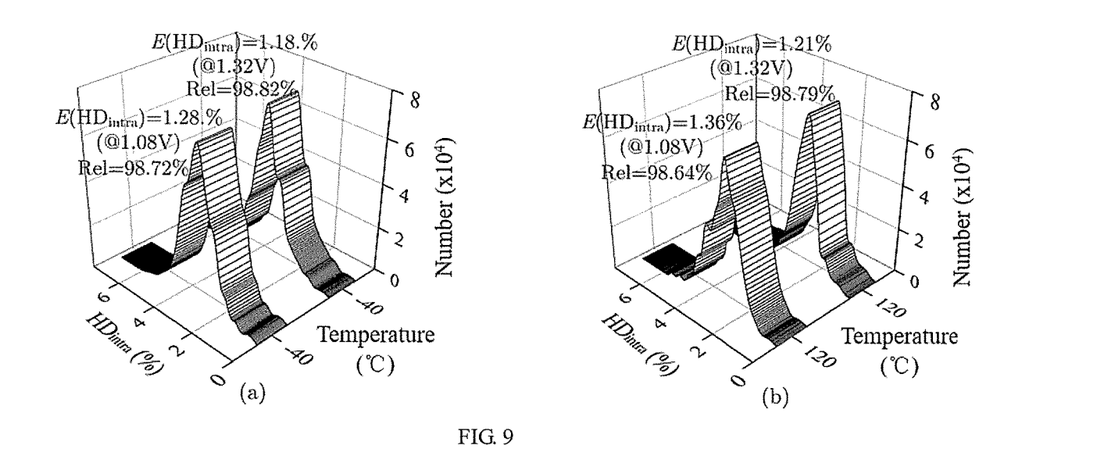
FIG. 9 shows the reliability distribution condition of the multi-port PUF circuit based on MOSFET current division deviations of the invention under four extreme working conditions (−40° C./1.08V, −40° C./1.32V, 120° C./1.08V, 120° C./1.32V).

Wherein, $E(HD_{intra})$ represents the average inter-chip Hamming Distance, $r_0$ and $r_l$ separately represent the n-bit output responses under the ideal operating condition (1.2V/25° C.) and under the contrast condition. FIG. 9 shows the reliability distribution condition of the multi-port PUF circuit based on MOSFET current division deviations of the invention under four extreme working conditions (−40° C./1.08V, −40° C./1.32V, 120° C./1.08V, 120° C./1.32V). As can be seen from FIG. 9, the minimum reliability of the PUF circuit under the working condition of 120° C./1.08V is 98.64%. Therefore, the reliability of the PUF circuit of the invention can be kept at 98.64% within the temperature range of −40~120° C. and within the voltage fluctuation of 1.08~1.32V.

Table 1 shows the performance contrast of the PUF circuit of the invention and PUF circuits of other types. The area and power consumption of each port of the PUF circuit (CM-PUF) are 1099 μm$^2$ and 0.32 μW separately, and the high reliability of 98.6% can still be ensured within large temperature and voltage variation ranges.

TABLE 1

Performance Contrast of PUF Circuits of Different Types

| Bibliography | Type | Multi-port | Process (nm) | Temperature (° C.) | Voltage fluctuation (%) | Reliability (%) | Area/port (μm$^2$) | Power/port (μW) |
|---|---|---|---|---|---|---|---|---|
| TVLSI 2016 | Arbiter-PUF | N | 180 | −40~100 | 6 | 96.8 | 21750 | 380 |
| TCAD 2015 | RO-PUF | N | 65 | −40~120 | 2.5 | 97.3 | 250 | 32.3 |
| VLSID 2011 | CM-PUF | N | 90 | −40~120 | 10 | 97.0 | 1110 | 788 |
| HOST 2013 | CM-PUF | N | 45 | −55~125 | 10 | 95.9 | 16000 | 108 |
| HOST 2014 | CM-PUF | N | 30 | 0~75 | 9 | 96.0 | 875 | 12.3 |
| The invention | CM-PUF | Y | 65 | −40~120 | 10 | 98.6 | 1099 | 0.32 |

In Table 1, Bibliography TVLSI 2016 refers to Bai C, Zou X, And Dai K. A novel thyristor-based silicon physical unclonable function[J]. *IEEE Transactions on Very Large Scale Integration(VLSI) Systems*, 2016, 24(1): 290-300. Bibliography TCAD 2015 refers to Cao Y, Zhang L, Chang C H, et al. A low-power hybrid RO PUF with improved thermal stability for lightweight applications [J]. IEEE Transactions on Computer-Aided Design of Integrated circuits and systems, 2015, 34(7): 1143-1147. Bibliography 2011 refers to Ganta D, Vivekraja V, Priya K, et al. A highly stable leakage-based silicon physical unclonable functions [C]. IEEE International Conference on VLSI Design, Madras, 2011: 135-140. Bibliography HOST 2013 refers to Kalyanaraman M and Orshansky M. Novel strong PUF based on nonlinearity of MOSFET subthreshold operation [C]. IEEE International Symposium on Hardware-Oriented Security and Trust (HOST), Austin, 2013: 13-18. Bibliography HOST 2014 refers to Kumar R and Burleson W. On design of a highly secure PUF based on non-linear current mirrors[C]. IEEE International Symposium on Hardware-Oriented Security and Trust (HOST), Washington, 2014: 38-43.

In conclusion, according to the PUF circuit of the invention, the PUF cells are constructed based on the MOSFET current division deviations in the sub-threshold region, and the multi-port PUF circuit is constructed based on the current differencing technique and the current comparison technique. The PUF circuit of the invention has the characteristic of low power consumption and can parallel output multiple keys in one clock period. Under the TSMC 65 nm CMOS process, the area and power consumption of each port of a 32-port PUF circuit with the capacity of 16 Kb are 1099 μm$^2$ and 0.32 μW separately. Experimental results show that the PUF circuit has high randomness and uniqueness while is small in area and low in power consumption and still has high reliability under large temperature and voltage variation conditions.

What is claimed is:

1. A MULTI-PORT PUF CIRCUIT BASED ON MOSFET CURRENT DIVISION DEVIATIONS, CHARACTERIZED IN THAT COMPRISES:

a reference source, comprising a $1^{st}$ voltage output terminal, a $2^{nd}$ voltage output terminal, a $3^{rd}$ voltage output terminal and a current output terminal;

a row decoder, comprising a control terminal, 128 input terminals and 7 output terminals;

a column decoder, comprising a control terminal, 2 input terminals and 4 output terminals a timing controller, comprising a $1^{st}$ output terminal and a $2^{nd}$ output terminal;

32 PUF arrays, comprises a 512 PUF cells, an arbiter, a $1^{st}$ inverter, a $2^{nd}$ inverter, a $3^{rd}$ inverter, a $4^{th}$ inverter and 8 transmission gates, wherein each transmission gate is provided with a $1^{st}$ control terminal, a $2^{nd}$ control terminal, an input terminal and an output terminal;

wherein the 8 transmission gates are a $1^{st}$ transmission gate, a $2^{nd}$ transmission gate, a $3^{rd}$ transmission gate, a $4^{th}$ transmission gate, a $5^{th}$ transmission gate, a $6^{th}$ transmission gate, a $7^{th}$ transmission gate and an $8^{th}$ transmission gate;

wherein the arbiter is configured with a $1^{st}$ input terminal, a $2^{nd}$ input terminal, a $1^{st}$ bias terminal, a $2^{nd}$ bias terminal and an output terminal;

wherein each of the PUF cell is comprises a control voltage input terminal, a control current input terminal, a selective signal input terminal, a $1^{st}$ output terminal and a $2^{nd}$ output terminal;

wherein the 512 PUF cells are arranged in 128 rows and 4 columns and the control voltage input terminals of the 512 PUF cells are coupled;

wherein a connecting terminal is a $1^{st}$ control voltage input terminal of the corresponding PUF array, the control current input terminals of the 512 PUF cells are coupled, the connecting terminal is the control current input terminal of the corresponding PUF array, wherein the selective signal input terminals of the PUF cells in the m$^{th}$ row are coupled, the connecting terminal is the m$^{th}$ row selective signal input terminal of the corresponding PUF array, and m=1, 2, . . . , 128, wherein the $1^{st}$ output terminals of the PUF cells in a $1^{st}$ column are connected to an input terminal of the $1^{st}$ transmission gate, the $2^{nd}$ output terminals of the PUF cells in the $1^{st}$ column are coupled to an input terminal of the $2^{nd}$ transmission gate, the $1^{st}$ output terminals of the PUF cells in the $2^{nd}$ column are coupled to an input terminal of the $3^{rd}$ transmission gate, the $2^{nd}$ output terminals of the PUF cells in the $2^{nd}$ column are coupled to an input terminal of the $4^{th}$ transmission gate, the $1^{st}$ output terminals of the PUF cells in the $3^{rd}$ column are coupled to an input terminal of the $5^{th}$ transmission gate, the $2^{nd}$ output terminals of the PUF cells in the $3^{rd}$ column are coupled to the input terminal of the $6^{th}$ transmission gate, the $1^{st}$ output terminals of the PUF cells in the $4^{th}$ column are coupled to an input terminal of the $7^{th}$ transmission gate, and the $2^{nd}$ output terminals of the PUF cells in the $4^{th}$ column are connected to an input terminal of the $8^{th}$ transmission gate;

wherein the $1^{st}$ control terminal of the $1^{st}$ transmission gate and the $1^{st}$ control terminal of the $2^{nd}$ transmission gate are connected to the input terminal of the $1^{st}$ inverter, the connecting terminal is the $1^{st}$ column selective signal input terminal of the corresponding PUF array, wherein the $2^{nd}$ control terminal of the $1^{st}$ transmission gate and the $2^{nd}$ control terminal of the $2^{nd}$ transmission gate are coupled to an output terminal of the $1^{st}$ inverter, the $1^{st}$ control terminal of the $3^{rd}$ transmission gate and a $1^{st}$ control terminal of the $4^{th}$ transmission gate are coupled to an input terminal of the $2^{nd}$ inverter, the connecting terminal is the $2^{nd}$ column selective signal input terminal of the corresponding PUF array, wherein the $2^{nd}$ control terminal of the $3^{rd}$ transmission gate and the $2^{nd}$ control terminal of the $4^{th}$ transmission gate are coupled to an output terminal of the $2^{nd}$ inverter, the $1^{st}$ control terminal of the $5^{th}$ transmission gate and the $1^{st}$ control terminal of the $6^{th}$ transmission gate are connected to the input terminal of the $3^{rd}$ inverter, the connecting terminal is the $3^{rd}$ column selective signal input terminal of the corresponding PUF array, wherein the $2^{nd}$ control terminal of the $5^{th}$ transmission gate and the $2^{nd}$ control terminal of the $6^{th}$ transmission gate are coupled to an output terminal of the $3^{rd}$ inverter; the $1^{st}$ control terminal of the $7^{th}$ transmission gate and the $1^{st}$ control terminal of the $8^{th}$ transmission gate are coupled to an input terminal of the $4^{th}$ inverter, the connecting terminal is the $4^{th}$ column selective signal input terminal of the corresponding PUF array, wherein the $2^{nd}$ control terminal of the $7^{th}$ transmission gate and the $2^{nd}$ control terminal of the $8^{th}$ transmission gate are coupled to an output terminal of the $4^{th}$ inverter;

wherein an output terminal of the $1^{st}$ transmission gate, an output terminal of the $3^{rd}$ transmission gate, an output terminal of the $5^{th}$ transmission gate and an output terminal of the $7^{th}$ transmission gate are coupled to a $1^{st}$ input terminal of the arbiter; an output terminal of the $2^{nd}$ transmission gate, an output terminal of the $4^{th}$ transmission gate, an output terminal of the $6^{th}$ transmission gate and an output terminal of the $8^{th}$ transmission gate are coupled to a $2^{nd}$ input terminal of the arbiter;

wherein the $1^{st}$ bias terminal of the arbiter is a $2^{nd}$ control voltage input terminal of the corresponding PUF array, and a $2^{nd}$ bias terminal of the arbiter is a $3^{rd}$ control voltage input terminal of the corresponding PUF array, wherein the $1^{st}$ voltage output terminal of the reference source is coupled to the $1^{st}$ control voltage input terminals of the PUF arrays, the $2^{nd}$ voltage output terminal of the reference source is coupled to the $2^{nd}$ control voltage input terminals of the 32 PUF arrays, the $3^{rd}$ voltage output terminal of the reference source is coupled to a $3^{rd}$ control voltage input terminals of the 32 PUF arrays, and the current output terminal of the reference source is coupled to a control current input terminal of the 32 PUF arrays, wherein a $m^{th}$ output terminal of the row decoder is coupled to a $m^{th}$ row selective signal input terminals of the 32 PUF arrays, a $j^{th}$ output terminal of the column decoder is coupled to the $j^{th}$ column selective signal input terminals of the 32 PUF arrays, and j=1, 2, 3, 4;

wherein a $1^{st}$ output terminal of the timing controller is coupled to a control terminal of the row decoder, and a $2^{nd}$ output terminal of the timing controller is coupled to a control terminal of the column decoder.

2. A multi-port PUF circuit based on MOSFET current division deviations according to claim 1, wherein each PUF cell comprises a $1^{st}$ NMOS transistor, a $2^{nd}$ NMOS transistor, a $3^{rd}$ NMOS transistor and a $4^{th}$ NMOS transistor, wherein a drain of the $1^{st}$ NMOS transistor is connected to a drain of the $2^{nd}$ NMOS transistor, and the connecting terminal is the control current input terminal of the PUF cell, a gate of the $1^{st}$ NMOS transistor is coupled to a gate of the $2^{nd}$ NMOS transistor, and the connecting terminal is the control voltage input terminal of the PUF cell; a source of the $1^{st}$ NMOS transistor is coupled to a drain of the $3^{rd}$ NMOS transistor, a the source of the $2^{nd}$ NMOS transistor is coupled to a drain of the $4^{th}$ NMOS transistor, a source of the $3^{rd}$ NMOS transistor is the $1^{st}$ output terminal of the PUF cell, and the source of the $4^{th}$ NMOS transistor is the $2^{nd}$ output terminal of the PUF cell, a gate of the $3^{rd}$ NMOS transistor is coupled to a gate of the $4^{th}$ NMOS transistor, and the connecting terminal is the selective signal input terminal of the PUF cell.

3. A multi-port PUF circuit based on MOSFET current division deviations according to claim 1, wherein each transmission gate comprises a $5^{th}$ NMOS transistor and a $1^{st}$ PMOS transistor, wherein the gate of the $5^{th}$ NMOS transistor is the $1^{st}$ control terminal of the transmission gate, and the gate of the $1^{st}$ PMOS transistor is the $2^{nd}$ control terminal of the transmission gate, wherein a source of the $5^{th}$ NMOS transistor is coupled to the source of the $1^{st}$ PMOS transistor, and the connecting terminal is an input terminal of the transmission gate, and wherein a drain of the $5^{th}$ NMOS transistor is coupled to a drain of the $1^{st}$ PMOS transistor, and the connecting terminal is an output terminal of the transmission gate.

4. A multi-port PUF circuit based on MOSFET current division deviations according to claim 1, wherein the arbiter comprises a $2^{nd}$ PMOS transistor, a $3^{rd}$ PMOS transistor, a $4^{th}$ PMOS transistor, a $5^{th}$ PMOS transistor, a $6^{th}$ PMOS transistor, a $6^{th}$ NMOS transistor, a $7^{th}$ NMOS transistor, an $8^{th}$ NMOS transistor, a $9^{th}$ NMOS transistor, a $10^{th}$ NMOS transistor, a $1^{st}$ operational amplifier, a $2^{nd}$ operational amplifier, a $5^{th}$ inverter, a $6^{th}$ inverter, a $7^{th}$ inverter, an $8^{th}$ inverter, a $9^{th}$ inverter, a $10^{th}$ inverter, a resistor and a capacitor, wherein the $1^{st}$ operational amplifier and the $2^{nd}$ operational amplifier each comprise a positive input terminal, a negative input terminal and an output terminal;

wherein a source of the $2^{nd}$ PMOS transistor, a source of the $3^{rd}$ PMOS transistor and a drain of the $6^{th}$ NMOS transistor are all accessed to a power supply, a drain of the $2^{nd}$ PMOS transistor is coupled to a source of the $4^{th}$ PMOS transistor, a drain of the $3^{rd}$ PMOS transistor is coupled to a source of the $5^{th}$ PMOS transistor, wherein a gate of the $2^{nd}$ PMOS transistor, a gate of the $3^{rd}$ PMOS transistor and a drain of the $5^{th}$ PMOS transistor are coupled to a drain of the $7^{th}$ NMOS transistor, a gate of the $4^{th}$ PMOS transistor, a gate of the $5^{th}$ PMOS transistor and a gate of the $9^{th}$ NMOS transistor are coupled to a gate of the $10^{th}$ NMOS transistor, and the connecting terminal is the $2^{nd}$ bias terminal of the arbiter;

wherein a drain of the $4^{th}$ PMOS transistor, a drain of the $8^{th}$ NMOS transistor, a source of the $6^{th}$ NMOS transistor and a source of the $6^{th}$ PMOS transistor are coupled to the input terminal of the $5^{th}$ inverter, a source of the $7^{th}$ NMOS transistor and a drain of the $9^{th}$ NMOS transistor are coupled to the negative input terminal of the $1^{st}$ operational amplifier, and the connecting terminal is a $1^{st}$ input terminal of the arbiter, wherein a positive input terminal of the $1^{st}$ operational amplifier is coupled to a positive input terminal of the $2^{nd}$ operational amplifier, and the connecting terminal is the $1^{st}$ bias terminal of the arbiter;

wherein a gate of the $7^{th}$ NMOS transistor is coupled to an output terminal of the $1^{st}$ operational amplifier and a source of the $8^{th}$ NMOS transistor and a drain of the $10^{th}$ NMOS transistor are coupled to the negative input terminal of the $2^{nd}$ operational amplifier, and the connecting terminal is the $2^{nd}$ input terminal of the arbiter, wherein a gate of the $8^{th}$ NMOS transistor is coupled to an output terminal of the $2^{nd}$ operational amplifier and a source of the $9^{th}$ NMOS transistor, the source of the $10^{th}$ NMOS transistor and the drain of the $6^{th}$ PMOS transistor are all grounded, wherein a gate of the $6^{th}$ NMOS transistor and a gate of the $6^{th}$ PMOS transistor are coupled to an output terminal of the $7^{th}$ inverter, wherein an input terminal of the $7^{th}$ inverter and an output terminal of the $6^{th}$ inverter are connected to one terminal of the resistor, and the other terminal of the resistor is coupled to first terminal of the capacitor, wherein a second terminal of the capacitor, an input terminal of the $6^{th}$ inverter and an output terminal of the $5^{th}$ inverter are coupled to an input terminal of the $8^{th}$ inverter, wherein an output terminal of the $8^{th}$ inverter is coupled to an input terminal of the $9^{th}$ inverter, an output terminal of the $9^{th}$ inverter is coupled to an input terminal of the $10^{th}$ inverter, and an output terminal of the $10^{th}$ inverter is an output terminal of the arbiter.

* * * * *